Figures 1, 2, 3:
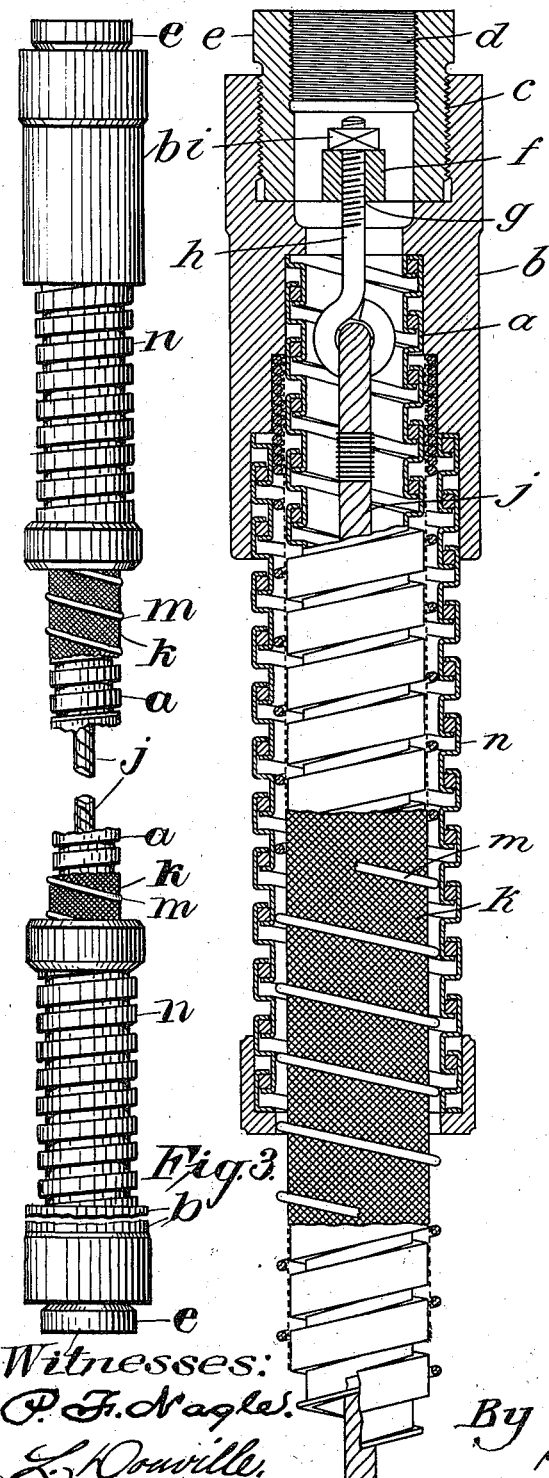

E. WITZENMANN.
METALLIC HOSE.
APPLICATION FILED OCT. 26, 1907.

996,899.

Patented July 4, 1911.

Witnesses:
P. F. Nagle.
L. Orville.

Inventor,
Emil Witzenmann,
By Diedersheim & Fairbanks.
Attorneys.

ured with

UNITED STATES PATENT OFFICE.

EMIL WITZENMANN, OF PFORZHEIM, GERMANY.

METALLIC HOSE.

996,899.  Specification of Letters Patent.  Patented July 4, 1911.

Application filed October 26, 1907. Serial No. 399,291.

*To all whom it may concern:*

Be it known that I, EMIL WITZENMANN, manufacturer, a subject of the Grand Duke of Baden, residing at No. 48 Holzgartenstrasse, Pforzheim, German Empire, have invented new and useful Improvements in Metallic Hose, of which the following is a specification.

My invention relates to metallic hose of that description in which the strain is taken up by a rope or the like connecting the end-pieces of the hose; and the essential feature of my invention is that the rope or equivalent means is secured at each end to the cross-piece or bridge of a nut screwed to each end-piece. Such a means of connection for the rope is particularly simple and inexpensive to manufacture.

One form of construction of my invention is illustrated in the accompanying drawing, in which:

Figure 1 is a longitudinal section of the upper end of a hose with end-piece. Fig. 2 is a plan of one of the nuts for attachment of the rope. Fig. 3 is a view partly in section showing two end pieces of hose.

The metallic hose $a$ (that is, flexible pipe consisting of a metal tape of suitable cross section wound upon itself) is provided at each extremity with an end-piece $b$, terminally tapped at $c$ to receive a hollow nut $e$ having a female thread $d$ for connecting purposes. This nut $e$ is provided with a central bridge or cross-piece $f$ (Fig. 2,) furnished in the middle with a hole $g$, through which there passes the screw eye-bolt $h$ attached to the end of the rope $j$. The bolt is held in position by means of the small nut $i$. The other end of the hose is arranged in the same manner, so that when the two ends of the rope are connected in the way indicated, the hose is relieved of all strain, its weight being taken up by the rope $j$. All danger of the mutually engaging flanges of the coils of the hose being torn asunder is thus effectually prevented.

To protect the outside wall of the hose from injury, it may be sheathed with wire-gauze $k$, the latter being also armored with spirally wound wire $m$ if desired. The hose ends may further be incased, for a certain distance, by a second metallic hose $n$.

Having thus described my invention, what I claim as new and desire to secure by Letters Patent is:—

1. In combination, a metallic hose, end pieces thereon internally threaded, hollow tension nuts externally threaded to engage the threads of the end pieces and having bridge pieces rigid therewith, adjustable means mounted in said bridge pieces, and means within the hose connected with said adjustable means.

2. In combination, a metallic hose, an end piece thereon, a member having threaded engagement with said end piece and internally threaded for connecting purposes, said member being provided with an integral bridge piece, a screw eye adjustably mounted in said bridge piece for adjustment independent of said member and also adjustable therewith, and means connected with said screw eye within the hose for connection with means at the opposite end of the latter.

In witness whereof I have hereunto signed my name this 10th day of October 1907, in the presence of two subscribing witnesses.

EMIL WITZENMANN.

Witnesses:
  B. WITZENMANN,
  ERNEST ENTENMANN.